US012005730B2

(12) United States Patent
Duffy et al.

(10) Patent No.: US 12,005,730 B2
(45) Date of Patent: Jun. 11, 2024

(54) SELF-HEALING SEAL FOR A WRITING INSTRUMENT

(71) Applicant: SOCIÉTÉ BIC, Clichy (FR)

(72) Inventors: David Duffy, Zurich (CH); Bernadette Elliott-Bowman, Leatherhead (GB)

(73) Assignee: SOCIÉTÉ BIC, Clichy (FR)

(*) Notice: Subject to any disclaimer, the term of this patent is extended or adjusted under 35 U.S.C. 154(b) by 0 days.

(21) Appl. No.: 18/000,094

(22) PCT Filed: May 27, 2021

(86) PCT No.: PCT/EP2021/064171

§ 371 (c)(1),
(2) Date: Nov. 28, 2022

(87) PCT Pub. No.: WO2021/239866

PCT Pub. Date: Dec. 2, 2021

(65) Prior Publication Data

US 2023/0211627 A1 Jul. 6, 2023

(30) Foreign Application Priority Data

May 29, 2020 (EP) .................................... 20315282

(51) Int. Cl.
*B43K 5/17* (2006.01)
*B43K 23/12* (2006.01)

(52) U.S. Cl.
CPC ................ *B43K 5/17* (2013.01); *B43K 23/12* (2013.01)

(58) Field of Classification Search
CPC . B43K 5/17; B43K 23/12; B43K 5/16; B43K 23/08
USPC .................................................. 401/107, 108
See application file for complete search history.

(56) References Cited

U.S. PATENT DOCUMENTS

| | | | | | |
|---|---|---|---|---|---|
| 4,269,525 | A * | 5/1981 | Melikian | B43K 8/24 401/108 |
| 6,135,660 | A | 10/2000 | Stevens et al. | |
| 9,802,439 | B2 | 10/2017 | Albenge et al. | |
| 2002/0131807 | A1* | 9/2002 | Ami | B43K 5/17 401/117 |
| 2008/0008517 | A1* | 1/2008 | Wang | B43K 5/17 401/107 |
| 2009/0142124 | A1 | 6/2009 | Dylkiewicz et al. | |

FOREIGN PATENT DOCUMENTS

| | | | |
|---|---|---|---|
| DE | 1561800 | A1 | 4/1970 |
| FR | 2988328 | A1 | 9/2013 |
| GB | 2233607 | A | 1/1991 |

OTHER PUBLICATIONS

International Search Report and Written Opinion issued in International Application No. PCT/EP2021/064171 dated Aug. 3, 2021 (11 pages).

* cited by examiner

*Primary Examiner* — David J Walczak
(74) *Attorney, Agent, or Firm* — Bookoff McAndrews, PLLC

(57) ABSTRACT

A writing instrument may include a self-healing sealing component to prevent the internal components of the writing instrument from drying out.

20 Claims, 2 Drawing Sheets

SELF-HEALING SEAL FOR A WRITING INSTRUMENT

CROSS REFERENCE TO RELATED APPLICATION

This patent application is a National Stage Application of and claims the benefit of priority to International Application No. PCT/EP2021/064171, filed on May 27, 2021, now published as WO 2021/239866 A1, which claims priority to European Application No. EP 20315282.2, filed on May 29, 2020, the entirety of which is incorporated herein by reference.

TECHNICAL FIELD

The present disclosure relates to writing instruments, and more particularly to writing instruments that dispense volatile inks, such as felt tip markers and the like.

BACKGROUND OF THE DISCLOSURE

This present disclosure relates to writing instruments that dispense volatile inks, such as felt tip markers and the like. The ink in such writing instruments may have a tendency to evaporate from its writing tip. The writing tip is also referred to as a nib. The ink formulations typically comprise dye and solvent in which the dye is dissolved. These ink solvents are typically volatile; being prone to evaporation when exposed to ambient air. If a sufficient amount of the ink solvent evaporates from the nib, the nib dries out, and the performance of the writing instrument substantially degrades.

The problem with ink evaporating from the nib may be solved by placing a cap over the nib when the writing instrument is not in use. However, this solution has the drawback that the cap is often not put back on the nib after use because users sometimes forget to put the cap back on or because the cap is misplaced. Without the cap, the nib may dry out and shorten the life of the writing instrument.

To overcome the problem of having to provide a cap for the writing instrument, some writing instruments are designed with a self-sealing element integrated into the writing instrument's housing. These writing instruments have their own problems in that such designs are complex and that the device is relatively bulky since the self-seal is a mechanical seal which requires relatively high forces to press the sealing members onto each other in order to achieve a self-sealing effect. Implementing these forces requires bulk in the sealing material and may result in a writing instrument being unwieldly and lacking elegance. Moreover, given the mechanical complexity of such seals, the assembly is also complex so that they may be unsuitable for high volume manufacturing processes.

Examples of such self-sealing writing instruments are disclosed in US 2009/0142124 A1. US 2009/0142124 A1 discloses a cap-less writing instrument wherein the writing tip is prevented from drying out by sealing it off to the environment with a sealing mechanism positioned at the writing instrument's tip which is activated by retracting the nib. The sealing mechanism involves pulling multiple fingers into a constraining sleeve to build up the physical force required to achieve an interference fit between the fingers. US 2009/0142124 A1 emphasizes that these fingers need to be drawn tightly against each other to form a reliable and repeatable seal. Thus, these fingers need bulk to have sufficient structural stability to establish the interference fit, a fact that is also evident from US 2009/0142124 A1 depicting these fingers as relatively bulky structures in the drawings.

It is the object of the present disclosure provide a simple, filigree and/or cost-effective means of sealing a writing instrument against drying out.

SUMMARY OF THE DISCLOSURE

In a first aspect, the present disclosure relates to a writing instrument comprising a tubular body. The tubular body may terminate in a writing orifice at the distal end of the tubular body. It should be understood that when the present disclosure refers to the distal end as the end comprising the end utilized for dispensing the ink of the writing instruments. Accordingly, the proximal end is the end of the writing instrument which is opposite to the distal end. The same applies to the proximal and distal ends of the tubular body. The writing instrument may further comprise a reservoir for storing a writing ink. The reservoir may be arranged proximally to the writing orifice.

The writing instrument may further comprise a nib which may be arranged distally to the reservoir. The nib may be in fluid communication with the reservoir. The nib may be configured to be axially translatable within the tubular body between a first retracted position in which the nib is positioned within the tubular body and not protruding through the writing orifice and a second extended position in which the nib protrudes through the writing orifice.

The writing instrument may further comprise an actuating means for axially translating the nib within the tubular body between the first retracted position and the second extended position. The second extended position may be position for writing, i.e. a position in which nib protrudes sufficiently through the writing orifice to be able to dispense ink when used by the user.

The writing instrument may further comprise a seal component. The seal component may be located within the tubular body at or adjacent to the writing orifice. The seal component may seal the nib and the reservoir from exposure to the environment in the first retracted position. The seal component may be configured to be ruptured when the nib is advanced into the second extended position for writing. The seal component may comprise a self-healing material. The seal component may be configured to at least partly restore its sealing property when the nib is retracted to the first retracted position.

In some embodiments, the seal component may be configured to substantially close the rupture, or at least to substantially reduce the rupture (i.e. the opening), created by the nib through self-healing when the nib is retracted to the first retracted position.

In some embodiments, the seal component may be configured to at least partly restore its sealing property in less than about 12 hours, more specifically less than about 6 hours, and in particular less than about 3 hours.

In some embodiments, the seal component may be ruptured by the nib or by a piercing mechanism when the nib is advanced into the second extended position for writing.

In some embodiments, the seal component may comprise one or more predetermined breaking points or lines, in particular wherein the one or more predetermined breaking points or lines have a reduced thickness in comparison to other areas of the seal component.

In some embodiments, the seal component may comprise one or more predetermined breaking points or lines which are arranged to create two, three or more leaflets when the seal component is ruptured. In particular, in this context, and also elsewhere, the term "leaflet" can be interpreted as a flap. More specifically, the two, three or more leaflets are adjacent one to each other and, more specifically each of these leaflets are made of the self-healing material. More specifically, the leaflets have the ability to at least partially close the created rupture between two adjacent leaflets and additionally or alternatively to at least partially repair damage inflicted to the material by the rupture, in particular on a molecular level, thereby allowing to at least partly restore the sealing property of the seal component. Additionally or alternatively, a leaflet may be any freely movable part of the ruptured seal component which is formed by rupturing the seal component.

In some embodiments, the nib or the piercing mechanism push the leaflets into the distal direction when the nib is advanced into the second extended position for writing and wherein the writing instrument may be configured to facilitate return of the leaflets to their original position for self-healing of the rupture when the nib is retracted to the first retracted position.

In some embodiments, the seal component may comprise a shape memory material which facilitates return of the leaflets to their original position for self-healing of the rupture when the nib is retracted to the first retracted position.

In some embodiments, the nib or the piercing mechanism may have a roughened surface or protrusions which facilitate return of the leaflets to their original position for self-healing of the rupture when the nib is retracted to the first retracted position.

In some embodiments, one or more elastomeric elements may be provided in or adjacent to the seal component which facilitate return of the leaflets to their original position for self-healing of the rupture when the nib is retracted to the first retracted position.

In some embodiments, the seal component may comprise a resiliently compressible material, wherein the nib or the piercing mechanism may compress and push at least a part of the seal component radially outward when the nib is advanced into the second extended position for writing, and wherein the compressed seal component may be configured to substantially return to its original shape for self-healing of the rupture when the nib is retracted to the first retracted position.

In some embodiments, the nib may be made of a fibrous material.

In some embodiments, the self-healing material may be selected from intrinsic self-healing materials or extrinsic self-healing materials.

In some embodiments, the self-healing material may be a crosslinked thermoplastic polymer. In some embodiments, it may be particularly advantageous that the self-healing material is a polyurethane comprising disulfide bridges or a polydisulfide, wherein self-healing involves formation of new disulfide bridges in the polymer.

In some embodiments, the writing instrument may be a felt pen, a highlighter, or a permanent or non-permanent marker.

DETAILED DESCRIPTION OF THE DISCLOSURE

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Figure 1:
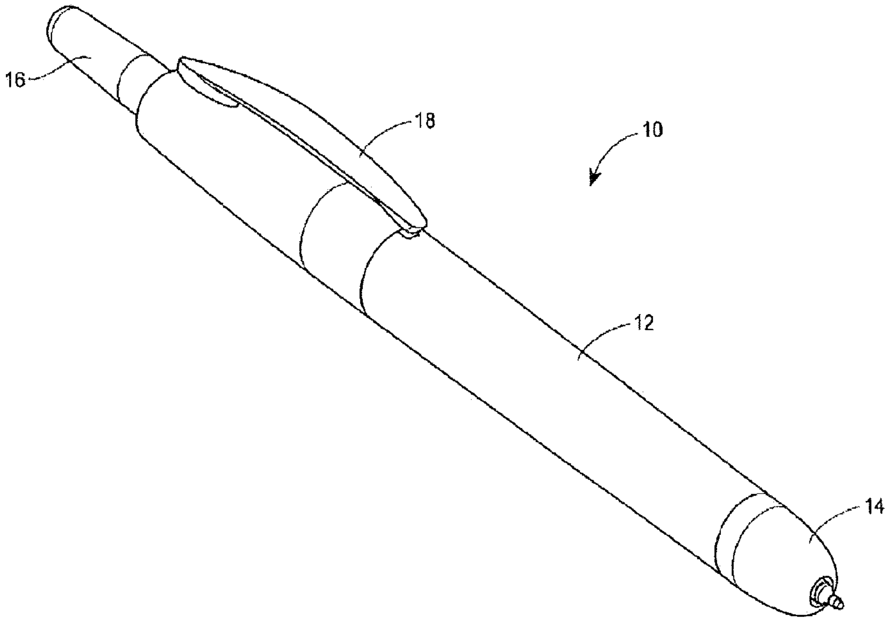
FIG. 1 shows an embodiment of a writing instrument according to the present disclosure.

In a first aspect, the present disclosure relates to a writing instrument. An embodiment of a writing instrument according to the present disclosure is described below with reference to FIG. 1. The writing instrument (10) may comprise a tubular body (12, 14). The tubular body may be a unitary body or it may comprise multiple components. In FIG. 1, the tubular component is made of multiple components and comprises a tip component (14) comprising a writing orifice which is located at the distal end of the tip component (14). The writing instrument (10) may further comprise a reservoir for storing a writing ink which may be arranged proximally to the writing orifice within or as part of the tubular body (12, 14). It is not shown in FIG. 1. The writing instrument (10) may further comprise a nib which may be arranged distally to the reservoir. The nib may be in fluid communication with the reservoir. In some embodiments, the fluid communication may be established by a channel connecting the reservoir and the nib or by the nib comprising a wick-like or porous element which extends into the reservoir and is configured to transport ink from the reservoir to the nib.

The nib may be configured to be axially translatable within the tubular body (12, 14) between a first retracted position in which the nib is positioned within the tubular body (12, 14) and not protruding through the writing orifice and a second extended position in which the nib protrudes through the writing orifice. The second extended position may be the position for writing, i.e. a position in which nib protrudes sufficiently through the writing orifice to be able to dispense ink when used by the user. In FIG. 1, the second extended position is shown in which the nib protrudes through the writing orifice. The writing instrument may further comprise an actuating means for axially translating the nib within the tubular body (12, 14) between the first retracted position and the second extended position. In the sense of the present disclosure, axial translation refers to a movement along the longitudinal axis of the tubular body (12, 14). The actuating means may comprise multiple components. In some embodiments, the actuating means may comprise a push button (16) which is arranged at the distal end of the tubular body (12, 14). FIG. 1 further features a clip (18) for affixing the writing instrument (10) to a substrate such as a clip board or a pocket. In some embodiments, the actuating means may comprise such a clip (18) which is then slidably or rotatably arranged at the distal end of the tubular body (12, 14) and configured to directly or indirectly axially translate the nib. In still other embodiments, the actuating means may be a circular element arranged on or in the tubular body (12, 14) which is configured to directly or indirectly axially translate the nib by rotating or sliding the circular element. In some embodiments, a spring may be arranged inside or outside the tubular body (12, 14), in particular to provide a means for reversing the axial translation provided by the actuating means. In some embodiment, the writing instrument (10) may further comprise a spring for axially translating the nib within the tubular body (12, 14) from the second extended position to the first retracted position. In FIG. 1, such a spring may be located within tubular body (12, 14) and configured to cooperate with push button (16) to provide the axial translations of the nib in the proximal and distal directions.

The writing instrument may further comprise a seal component. The seal component may be located within the tubular body (12, 14) at or adjacent to the writing orifice. In FIG. 1, the seal component may be located within the tip component (14). The seal component may seal the nib and the reservoir from exposure to the environment in the first retracted position. The seal component may be configured to be ruptured when the nib is advanced into the second extended position for writing. In some embodiments, the seal may be configured to be ruptured by the nib itself. In some embodiments, in particular when the nib is made of a softer material, the seal may be configured to be ruptured by a piercing mechanism. The seal component may comprise a self-healing material. Self-healing materials as such are known in the art and the self-healing materials of the present disclosure are to be understood as the term is conventionally used in the art. Additionally or alternatively, self-healing materials may be characterized by their ability to at least partially repair damage inflicted to the material by the rupture. Additionally or alternatively, self-healing materials may be characterized by their ability to at least partially repair damage inflicted to the material by the rupture on a molecular level. In some embodiments, the repair on a molecular level may comprise the formation of new covalent bonds and/or the formation of multiple hydrogen bridges per molecule and/or the formation of salt bridges.

The seal component may be configured to at least partly restore its sealing property when the nib is retracted to the first retracted position. In some embodiments, the seal component may be configured to at least partly restore its sealing property in less than about 12 hours, more specifically less than about 6 hours, and in particular less than about 3 hours. In some embodiments, it may be advantageous that the seal component is configured to restore its sealing property when the nib is retracted to the first retracted position. In some embodiments, it may be advantageous that the seal component is configured to close at least about 70%, specifically at least about 80%, more specifically at least about 90%, and in particular at least about 95% or all of the rupture in less than about 12 hours, more specifically less than about 6 hours, and in particular less than about 3 hours.

In some embodiments, the seal component may be configured to substantially close the rupture created by the nib through self-healing when the nib is retracted to the first retracted position, or at least to substantially reduce it. It should be understood that a rupture may be considered as substantially closed when the sealing property of the seal component is regained to such an extent that the drying out of the writing instrument (10) is prevented for a timespan that corresponds to the typical period of use of the writing instrument (10), for instance about 1 month, about 3 months, or about 6 months, under typical storage conditions, such as about 25° C. at about 40% relative humidity. Additionally or alternatively, a rupture may be considered as substantially closed when the sealing property of the seal component is regained to such an extent that the time for drying out of the writing instrument (10) is prolonged by a factor of at least about 5, specifically at least about 10, more specifically at least about 15, and in particular at least about 20, in comparison to the same writing instrument in which the nib being is kept in the second extended position under otherwise identical storage conditions (e.g. about 25° C. at about 40% relative humidity). The time span until the writing instrument (10) is dried out may be determined by any suitable means. One example may be the loss of the writing instrument's (10) ability to write an uninterrupted clean line.

In some embodiments, the seal component may be ruptured by the nib or by a piercing mechanism when the nib is advanced into the second extended position for writing. In some embodiments, the actuating means for axially translating the nib within the tubular body (12, 14) between the first retracted position and the second extended position may also actuate the piercing mechanism. In some embodiments, it may be particularly advantageous that the writing instrument comprises a tubular piercing mechanism which is arranged radially outward of the nib, which is actuated together with the nib, which is configured to be pierce the seal component before the nib contacts the seal component and which is configured to stop its movement into the distal direction prior to the nib reaching the second extended position. The latter feature ensures that the piercing mechanism does not impede writing with the nib. It can, for example, be implemented by providing the actuating means with a stop element which is blocks further axial advancement of the piercing mechanism after having pierced the seal.

In some embodiments, the seal component may be a membrane or film. The thickness of the membrane or film is not particularly limited and can, for example be between about 0.5 mm to about 5 mm, in particular between about 0.7 mm and about 4 mm, and in particular between about 1 mm and about 3 mm. In some embodiments, the seal component may comprise one or more predetermined breaking points or lines. A breaking point of breaking line is an area where a rupture preferentially occurs. In some embodiments, it may be particularly advantageous that the one or more predetermined breaking points or lines have a reduced thickness in comparison to other areas of the seal component.

Figure 2:
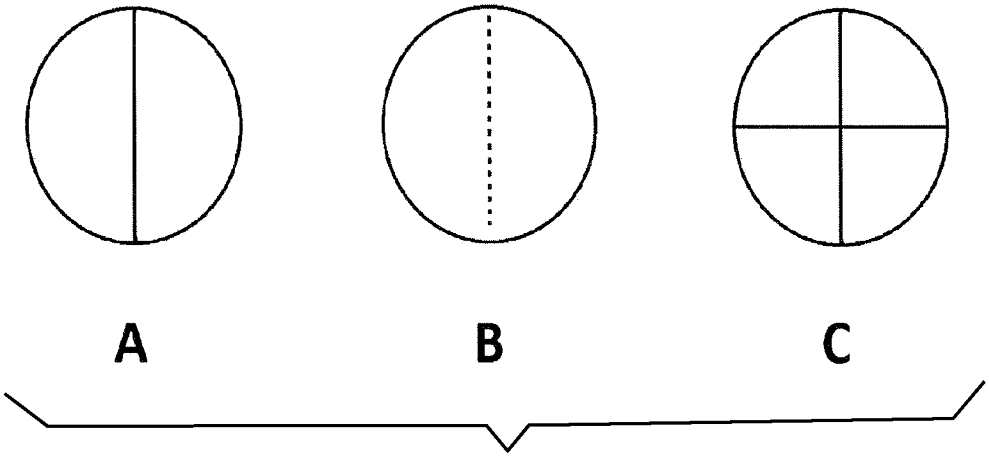
FIG. 2 shows embodiments of sealing elements.

The spatial arrangement of the predetermined breaking points or lines is not particularly limited. Some exemplary designs are shown in FIG. 2. FIG. 2 shows circular membrane-like sealing components having different designs of predetermined breaking points or lines. Design A shows a single breaking line that runs through the center of the membrane and dissects it into two leaflets upon rupturing. Design B exhibits the same rupture behavior with a plurality of breaking points which are arranged as a dotted line. Design C shows two breaking lines which dissect the sealing component into four leaflets upon rupturing.

In some embodiments, the seal component may comprise one or more predetermined breaking points or lines which are arranged to create two, three, four, or more leaflets when the seal component is ruptured.

Figure 3:
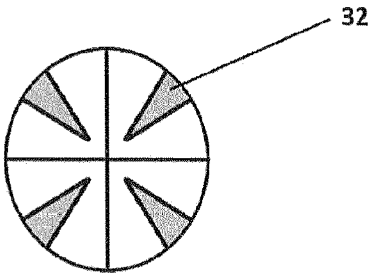
FIG. 3 shows another embodiment of a sealing element.

In some embodiments, the nib or the piercing mechanism may push the leaflets into the distal direction when the nib is advanced into the second extended position for writing. The writing instrument (10) may be configured to facilitate return of the leaflets to their original position for self-healing of the rupture when the nib is retracted to the first retracted position. In some embodiments, the seal component may comprise a shape memory material which facilitates return of the leaflets to their original position for self-healing of the rupture when the nib is retracted to the first retracted position. An exemplary arrangement is shown in FIG. 3 in which the seal component has the aforementioned design C and in which a plurality of wedge-shaped beams (32) is arranged between the predetermined breaking lines such that each of the four leaflets created upon rupture of the sealing component is provided with a wedge-shaped beam. The wedge-shaped beams are made of a shape memory material and urge the leaflets back towards their original position for self-healing after return of the nib to its first retracted position.

The term shape memory material is to be broadly construed as referring to any material which is not the self-healing material and which facilitates return of the leaflets to their original position. In some embodiments, the shape memory material may be selected from resiliently deformable polymers or shape memory alloys such as Nitinol.

In some embodiments, the nib or the piercing mechanism may have a roughened surface or protrusions which facilitate return of the leaflets to their original position for self-healing of the rupture when the nib is retracted to the first retracted position. In some embodiments, a nib having such a roughened surface may be fiber-based nib such as a felt nib. In some embodiments, a nib or the piercing mechanism having such protrusions may be a nib or the piercing mechanism having circumferentially arranged protrusions which taper into the distal direction. The "barb-like" or "arrow-like" arrangement of such protrusions may facilitate pushing the leaflets out of the way of the advancing nib and may facilitate return of the leaflets to their original position for self-healing when actuated in the reverse direction.

In some embodiments, one or more elastomeric elements may be provided in or adjacent to the seal component which facilitate return of the leaflets to their original position for self-healing of the rupture when the nib is retracted to the first retracted position. In some embodiments, the leaflets created by the rupture of the seal component may be attached on their proximal side to elastomeric elements which are directly or indirectly attached to the tubular body (12, 14). The elastomeric elements are tensioned when the leaflets are pushed into the distal direction and can pull back the leaflets when the nib is retracted into its first retracted position.

In some embodiments, the seal component may comprise a resiliently compressible material, wherein the nib or the piercing mechanism may compress and push at least a part of the seal component radially outward when the nib is advanced into the second extended position for writing, and wherein the compressed seal component may be configured to substantially return to its original shape for self-healing of the rupture when the nib is retracted to the first retracted position. In some embodiments, the resiliently compressible material may be a foam. In some embodiments, the resiliently compressible material may be a thermoplastic polyurethane. In some embodiments, the seal-healing material of the seal component may be a resiliently compressible material, in particular a foam or a thermoplastic polyurethane.

The selection of the self-healing material is not particularly limited. Self-healing materials may be primarily categorized as extrinsic and intrinsic. Four different types of self-healing materials are generally known in the art for: (a) encapsulation of reactive monomers that are released after a rupture. The reactive monomers may also be stored in other internal compartments such as rods or veins running through the polymer. Such materials are called extrinsic self-healing materials. Example materials for use in extrinsic self-healing compounds are Poly(dimethylsiloxane) (PDMS), epoxy resin, epoxy vinyl ether, poly(methyl methacrylate) (PMMA), polystyrene. (b) The formation of new irreversibly covalent bonds in the damaged area, (c) supramolecular self-assembly, and (d) the formation of reversible covalent bonds in the material. The latter three types are called intrinsic self-healing materials. Example materials for use as intrinsic self-healing compounds are polyurethanes and polyureas.

In some embodiments, it may be advantageous that the self-healing material may be selected from intrinsic self-healing materials comprising functional groups capable of forming reversible covalent bonds during the self-healing. In some embodiments, the self-healing material may be a crosslinked thermoplastic polymer comprising functional groups capable of forming reversible covalent bonds during the self-healing. In some embodiments, it may be particularly advantageous that the self-healing material is a polyurethane comprising disulfide bridges or a polydisulfide, wherein self-healing involves formation of new disulfide bridges in the polymer. This polyurethane material comprising disulfide bridges is an example of intrinsic self-healing material belonging to the aforementioned category (d), as the healing mechanism relies on the reversible creation of covalent bonds in the material.

In some embodiments, the nib may be made of a fibrous material.

In some embodiments, the writing instrument may be a felt pen, a highlighter, or a permanent or non-permanent marker.

In the following the present disclosure will be further elaborated by way of on Example.

EXAMPLE

The preparation of writing instruments is well-known in the art. As such, the following disclosure will focus on the sealing component.

Figure 4:
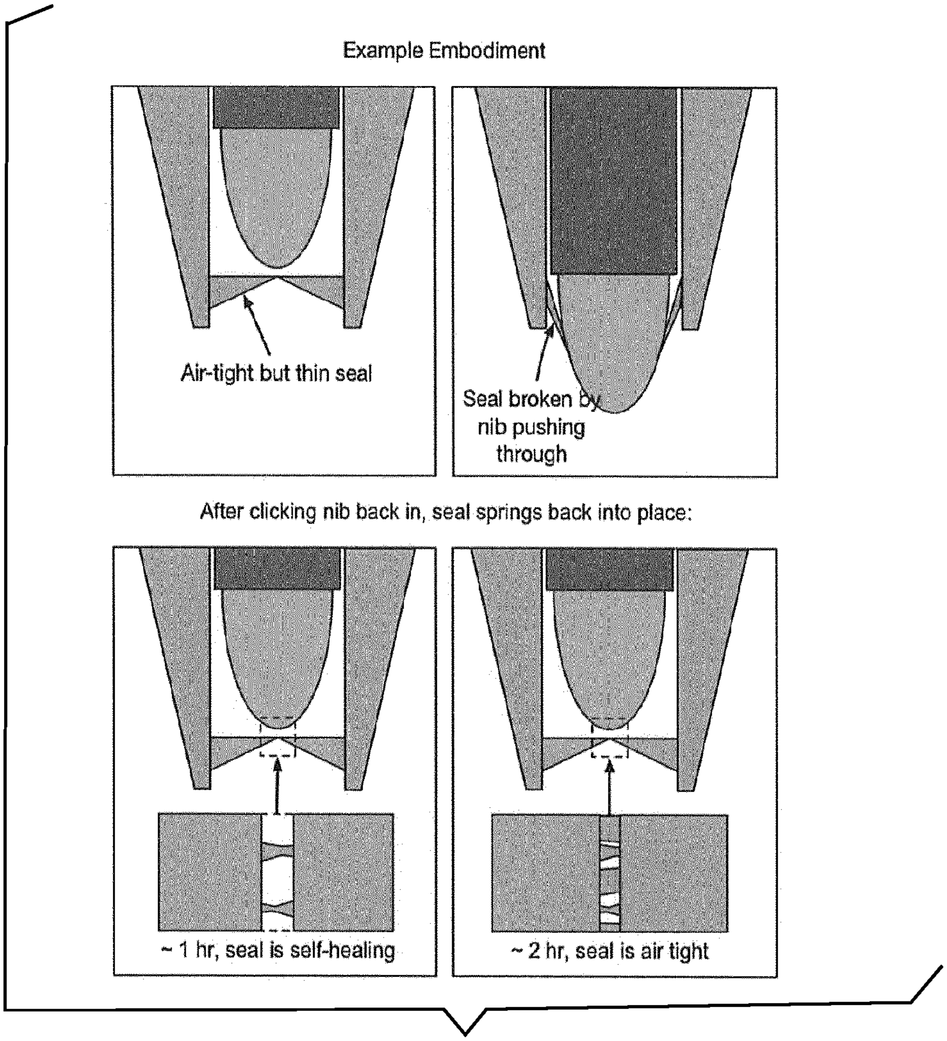
FIG. 4 shows an exemplary embodiment of a sealing component according to the disclosure.

FIG. 4 shows the writing tip of a writing instrument. The seal component is a membrane which is spanning the cross-sectional area of the at the writing orifice. The membrane is provided with a breaking line.

As shown in in FIG. 4, the advancing nib breaks through the seal component. After writing, the nib is retracted to a position beyond the seal component. The seal component spring back into its original position. The ruptured pieces regain contact to each other and the self-healing material initiates its repair mechanism to provide an air-tight seal which prevents drying-out of the writing nib in its retracted position.

Although the preferred embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A writing instrument comprising:

a tubular body terminating in a writing orifice at a distal end of the tubular body;

a reservoir for storing a writing ink which is arranged proximally to the writing orifice;

a nib arranged distally to the reservoir and in fluid communication with the reservoir, wherein the nib is configured to be axially translatable within the tubular body between a first retracted position in which the nib is positioned within the tubular body and not protruding through the writing orifice and a second extended position in which the nib protrudes through the writing orifice;

an actuating means for axially translating the nib within the tubular body between the first retracted position and the second extended position for writing;

a seal component located within the tubular body at or adjacent to the writing orifice which seals the nib and the reservoir from exposure to an environment in the first retracted position, wherein the seal component is configured to be ruptured when the nib is advanced into the second extended position for writing, wherein the seal component comprises a self-healing material selected from intrinsic self-healing materials or extrinsic self-healing materials, and wherein the seal component is configured to at least partly restore its sealing property when the nib is retracted to the first retracted position.

2. The writing instrument of claim 1, wherein the seal component is configured to close the rupture created by the nib through self-healing when the nib is retracted to the first retracted position.

3. The writing instrument of claim 1, wherein the seal component is configured to at least partly restore its sealing property in less than 12 hours.

4. The writing instrument of claim 1, wherein the seal component is configured to at least partly restore its sealing property in less than 6 hours.

5. The writing instrument of claim 1, wherein the seal component is configured to at least partly restore its sealing property in less than 3 hours.

6. The writing instrument of claim 1, wherein the seal component is ruptured by the nib or by a piercing mechanism when the nib is advanced into the second extended position for writing.

7. The writing instrument of claim 6, wherein the seal component comprises one or more predetermined breaking points or lines.

8. The writing instrument according to claim 7, wherein the one or more predetermined breaking points or lines have a reduced thickness in comparison to other areas of the seal component.

9. The writing instrument of claim 7, wherein the one or more predetermined breaking points or lines are arranged to create two, three or more leaflets when the seal component is ruptured.

10. The writing instrument of claim 9, wherein the nib or the piercing mechanism pushes the leaflets in a distal direction when the nib is advanced into the second extended position for writing and wherein the writing instrument is configured to facilitate return of the leaflets to their original position for self-healing of the rupture when the nib is retracted to the first retracted position.

11. The writing instrument of claim 10, wherein the seal component comprises a shape memory material which facilitates return of the leaflets to their original position for self-healing of the rupture when the nib is retracted to the first retracted position.

12. The writing instrument of claim 10, wherein the nib or the piercing mechanism has a roughened surface or protrusions which facilitate return of the leaflets to their original position for self-healing of the rupture when the nib is retracted to the first retracted position.

13. The writing instrument of claim 10, wherein one or more elastomeric elements are provided in or adjacent to the seal component which facilitate return of the leaflets to their original position for self-healing of the rupture when the nib is retracted to the first retracted position.

14. The writing instrument of claim 6 wherein the seal component comprises a resiliently compressible material, wherein the nib or the piercing mechanism compress and push at least a part of the seal component radially outward when the nib is advanced into the second extended position for writing, and wherein the compressed seal component is configured to return to its original shape for self-healing of the rupture when the nib is retracted to the first retracted position.

15. The writing instrument of claim 1, wherein the nib is made of a fibrous material.

16. The writing instrument of claim 1, wherein the self-healing material is a crosslinked thermoplastic polymer.

17. The writing instrument of claim 1, wherein the self-healing material is a crosslinked polyurethane polymer comprising disulfide bridges or a polydisulfide, wherein self-healing involves formation of new disulfide bridges in the polymer.

18. The writing instrument of claim 1, wherein the writing instrument is a felt pen, a highlighter, or a permanent or non-permanent marker.

19. A writing instrument comprising:

a tubular body terminating in a writing orifice at a distal end of the tubular body;

a reservoir for storing a writing ink which is arranged proximally to the writing orifice; a nib arranged distally to the reservoir and in fluid communication with the reservoir and includes a piercing mechanism, wherein the nib is configured to be axially translatable within the tubular body between a first retracted position in which the nib is positioned within the tubular body and not protruding through the writing orifice and a second extended position in which the nib protrudes through the writing orifice;

an actuating means for axially translating the nib within the tubular body between the first retracted position and the second extended position for writing;

a seal component located within the tubular body at or adjacent to the writing orifice which seals the nib and the reservoir from exposure to an environment in the first retracted position, wherein the seal component is configured to be ruptured by the piercing mechanism when the nib is advanced into the second extended position for writing, wherein the seal component includes one or more predetermined breaking points or lines which are arranged to create two or more leaflets when the seal component is ruptured, wherein the seal component comprises a self-healing material, and wherein the nib or the piercing mechanism include a roughened surface or protrusions to facilitate return of the leaflets to their original position when the nib is retracted to the first retracted position, and the seal component is configured to at least partly restore its sealing property when the nib is retracted to the first retracted position.

20. A writing instrument comprising:

a tubular body terminating in a writing orifice at a distal end of the tubular body;

a reservoir for storing a writing ink which is arranged proximally to the writing orifice;

a nib arranged distally to the reservoir and in fluid communication with the reservoir, wherein the nib is configured to be axially translatable within the tubular body between a first retracted position in which the nib is positioned within the tubular body and not protruding through the writing orifice and a second extended position in which the nib protrudes through the writing orifice;

an actuating means for axially translating the nib within the tubular body between the first retracted position and the second extended position for writing;

a seal component located within the tubular body at or adjacent to the writing orifice which seals the nib and the reservoir from exposure to an environment in the first retracted position, wherein the seal component is configured to be ruptured when the nib is advanced into the second extended position for writing, wherein the seal component comprises a self-healing material including a crosslinked thermoplastic polymer, and wherein the seal component is configured to at least partly restore its sealing property when the nib is retracted to the first retracted position.

* * * * *